United States Patent
Marupaduga

(10) Patent No.: US 10,292,160 B1
(45) Date of Patent: May 14, 2019

(54) PRIORITIZING UPLINK GRANTS TO MOBILE DEVICES ASSIGNED TO FREQUENCIES SUBJECT TO GROUP DELAY VARIATION

(71) Applicant: Sprint Spectrum L.P., Overland Park, KS (US)

(72) Inventor: Sreekar Marupaduga, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 163 days.

(21) Appl. No.: 15/435,576

(22) Filed: Feb. 17, 2017

(51) Int. Cl.
  *H04W 72/04* (2009.01)
  *H04W 74/08* (2009.01)
  *H04W 72/10* (2009.01)
  *H04W 72/14* (2009.01)

(52) U.S. Cl.
  CPC ....... *H04W 72/0453* (2013.01); *H04W 72/10* (2013.01); *H04W 72/14* (2013.01); *H04W 74/0833* (2013.01)

(58) Field of Classification Search
  None
  See application file for complete search history.

(56) References Cited

U.S. PATENT DOCUMENTS

| | | | |
|---|---|---|---|
| 9,144,079 B1 * | 9/2015 | Marupaduga | H04W 72/085 |
| 2005/0113120 A1 * | 5/2005 | Rappaport | H04B 7/0413 |
| | | | 455/500 |
| 2009/0280749 A1 * | 11/2009 | Tanno | H04L 12/2854 |
| | | | 455/67.13 |
| 2012/0063305 A1 * | 3/2012 | Chiu | H04W 74/0833 |
| | | | 370/230 |
| 2013/0058315 A1 * | 3/2013 | Feuersanger | H04W 52/281 |
| | | | 370/336 |
| 2013/0250925 A1 * | 9/2013 | Lohr | H04W 72/0446 |
| | | | 370/336 |
| 2013/0301541 A1 * | 11/2013 | Mukherjee | H04W 74/0833 |
| | | | 370/329 |
| 2014/0029586 A1 * | 1/2014 | Loehr | H04W 56/0005 |
| | | | 370/336 |
| 2015/0031410 A1 * | 1/2015 | Lim | H04W 52/146 |
| | | | 455/522 |
| 2017/0078058 A1 * | 3/2017 | Marinier | H04L 5/0044 |
| 2017/0142726 A1 * | 5/2017 | Kim | H04B 7/0632 |
| 2017/0142743 A1 * | 5/2017 | Yoon | H04L 5/0048 |
| 2018/0070264 A1 * | 3/2018 | Saiwai | H04W 72/04 |
| 2018/0098349 A1 * | 4/2018 | Sun | H04W 72/0406 |
| 2018/0184460 A1 * | 6/2018 | Hou | H04W 74/08 |

\* cited by examiner

*Primary Examiner* — Nicholas Sloms

(57) ABSTRACT

Systems and methods are disclosed for prioritizing uplink grants to mobile devices based on group delay variation considerations. A base station may receive (i) a first random access channel (RAC) request from a first user equipment device (UE) assigned to operate in a first frequency band of a wireless communication network and (ii) a second RAC request from a second UE assigned to operate in a different, second frequency band of the wireless communication network, both request being for uplink communications. Upon determining that the first frequency band is more susceptible to group delay variation based impairments than the second frequency band, the base station prioritizes an uplink channel grant of the first RAC request over an uplink channel grant of the second RAC request.

16 Claims, 6 Drawing Sheets

PRIORITIZING UPLINK GRANTS TO MOBILE DEVICES ASSIGNED TO FREQUENCIES SUBJECT TO GROUP DELAY VARIATION

BACKGROUND

Unless otherwise indicated herein, the materials described in this section are not prior art to the claims and are not admitted to be prior art by inclusion in this section.

Cellular wireless networks typically include a number of base stations that radiate to define wireless coverage areas, such as cells and/or cell sectors, in which user equipment devices (UEs) (also referred to as wireless communication devices (WCDs)) such as cell phones, "smart" phones, tablet computers, tracking devices, embedded wireless modules, and other wirelessly equipped communication devices, can operate. Each base station is coupled to network infrastructure that provides connectivity with one or more transport networks, such as the public switched telephone network (PSTN) for voice communications and/or the Internet for voice and/or data communications for instance.

In general, a wireless network operates in accordance with a particular air interface protocol or radio access technology, with communications from the base stations to UEs defining a downlink or forward link and communications from the UEs to the base stations defining an uplink or reverse link. Examples of existing air interface protocols include, without limitation, Orthogonal Frequency Division Multiple Access (OFDMA (e.g., Long Term Evolution (LTE) or Wireless Interoperability for Microwave Access (WiMAX)), Code Division Multiple Access (CDMA) (e.g., 1×RTT and 1×EV-DO), and Global System for Mobile Communications (GSM), among others. Each protocol defines its own procedures for registration of UEs, initiation of communications, allocation of bandwidth for UE communications, handoff/handover between coverage areas, and functions related to air interface communication.

In practice, a base station may be configured to provide service to UEs on multiple carrier frequencies or "carriers." Each carrier could be a time division duplex (TDD) carrier that defines a single frequency channel multiplexed over time between downlink and uplink use, or a frequency division duplex (FDD) carrier that defines two separate frequency channels, one for downlink communication and one for uplink communication. Each frequency channel of a carrier may then occupy a particular frequency bandwidth (e.g., 1.4 MHz, 3 MHz, 5 MHz, 10 MHz, or 20 MHz) defining a range of frequency at a particular position (e.g., defined by a center frequency) in a radio frequency band (e.g., in the 800 MHz band, the 1.9 GHz band, or the 2.5 GHz band).

With this arrangement, a UE within the coverage area of the wireless network may engage in air interface communication with a base station. This arrangement enables UEs to communicate via the base station with various remote network entities or with other UEs served by the base station or by one or more other base stations.

Overview

Communications from a base station to a UE are carried on a "forward link" (e.g., in a CDMA system) or "downlink" (e.g., in a UMTS/LTE network) of an air interface between the UE and base station, and communications from a UE to the base station are carried on "reverse link" (e.g., in a CDMA system) or "uplink" (e.g., in a UMTS/LTE network) of the air interface. By way of example, the discussion herein will be made with reference to LTE, and the terms downlink and uplink will therefore be adopted. However, it should be understood that discussion applies as well to forward and reverse links.

When a cellular wireless network serves UEs, the network may allocate various resources to facilitate communication to and from the UEs. In an example arrangement, for instance, the network may allocate "bearers" that define physical or logical communication channels extending between the UEs and a transport network. Each such bearer may include a radio-bearer component that extends between a UE and a serving base station and an access-bearer component that extends between the serving base station and the transport network. Further, each such bearer may have an associated service level, such as "best effort" or "guaranteed bit rate" for instance, to support a particular quality of service or type of service. In practice, the network may then allocate a number of such bearers for a UE, to support various different types of communication services.

By way of example, when the UE first enters into coverage of a base station, the UE may engage in a registration or "attachment" process that causes the network to allocate for the UE certain default bearers in accordance with the UE's service profile. For instance, if the UE's service profile indicates that the UE supports general packet-data communication (such as web browsing, file transfer, and the like), the network may allocate for the UE a default bearer for carrying such communications with a best-effort service level. Further, if the UE's service profile indicates that the UE supports voice over Internet Protocol (VoIP) communications or other such real-time packet-based communication service, the network may allocate for the UE a default bearer to support Session Initiation Protocol (SIP) signaling or the like to facilitate setup of such communications.

Once a UE has attached to or registered in the network, a base station may assign the UE one or more bearer channels so that the UE can actively engage in one or another type of communication service. Channel assignment may be made when the base station initiates a communication to the UE and/or when the UE initiates a communication to (or via) the base station. For downlink communications, the base station can coordinate and schedule transmissions to the UE with those to other UEs being served. For uplink transmissions, the UE typically transmits a request for an uplink bearer channel on a Random Access Channel ("RAC") designated for such requests. Requests on the RAC—"RAC requests"—are random in the sense that UEs can request access at any time, and thus their requests are random with respect to each other. The base station may then respond to RAC request as they are received and according to availability of requested resources (e.g., uplink channels).

In a typical cellular wireless network, each of a base station's coverage areas will operate on one or more carrier frequencies, or carrier frequency bands, and will define various channels for carrying control and bearer data between the base station and the UEs served by the base station. Carrier bands may be further subdivided into sub-carrier frequencies, as described below. The base station may then manage communication of packet data to and from served UEs over the air interface. For instance, as the base station receives packet data from the network infrastructure for transmission to UEs on various bearers, the base station may queue the data, schedule use of particular downlink air interface resources (e.g., channels, resource blocks, or the like) to carry the data, and transmit the data on the scheduled resources to the destination UEs. Likewise, as UEs have data to transmit on various bearers, the base station may schedule use of particular uplink air interface resources to carry the data, and the UEs may transmit the data on the scheduled uplink resources to the base station.

In operation, a base station typically includes amplifiers to amplify radio frequency (RF) signals, band-pass filters to pass the configured frequency range (i.e., the pass band of the filter), and band-stop filters to block frequencies outside of the configured frequency range. For example, in some LTE deployments, a base station may be configured with filters that pass an entire LTE band (e.g., LTE "Band 41") and block frequencies outside of the band. In other LTE deployments, a base station may be configured with filters that pass a portion of an LTE band (e.g., a 50 MHz range of frequencies within LTE Band 41 and block frequencies outside of the desired portion the LTE band (e.g., outside of the desired 50 MHz frequency range). Similarly, a UE may include RF amplifiers and filters for shaping and conditioning uplink transmission.

Signals that traverse the amplifiers and filters of base stations and/or UEs will experience various signal impairments, including group delay ("GD"), which is a measure of the time delay of the amplitude envelopes of the various sinusoidal components (e.g., sub-carriers in multi-carrier transmission systems) of the signal as the signal propagates through a filter and/or amplifier. Group delay is inversely proportional to filter bandwidth and nearly proportional to the order of the filter. In multi-carrier transmission systems, all of the sub-carriers of a signal are delayed when the signal propagates through a filter and/or amplifier. However, the delay tends to be frequency-dependent, and thus, the delay will be different for the various sub-carriers, a phenomenon referred to as group delay variation (or "GDV"). For example, sub-carriers near the edge of the filter's pass band tend to experience greater group delay than sub-carriers in the middle of the filter's pass band.

In LTE networks, group delay variation tends to be more problematic than the delay of any individual sub-carrier in part because of the way sub-carriers are managed and allocated for data transmissions between base stations and UEs. In particular, in LTE networks, an LTE band is divided into many small resource blocks, where each resource block includes twelve 15 kHz sub-carriers. In the downlink direction, LTE uses OFDMA to allocate resource blocks to data transmissions, where the sub-carriers of an active resource block are modulated using, for example, QPSK (Quadrature Phase-Shift Keying), 16-QAM (Quadrature Amplitude Modulation), 64-QAM, or perhaps other digital modulation schemes. In the uplink direction, LTE uses a pre-coded version of OFDM known as Single Carrier Frequency Division Multiple Access (SC-FDMA), where data is spread across the sub-carriers of one or more resource blocks, which are modulated using, for example, QPSK, 16-QAM, 64-QAM, or perhaps other digital modulation schemes. Differences in the group delay between the sub-carriers of a resource block, as well as differences in the group delay between sub-carriers of different resource blocks, can cause signal distortions that reduce signal quality. Group delay variation based distortion may render some sub-carriers unable support higher order modulation schemes (e.g., 16-QAM and 64-QAM). As a result, in some instances, the affected sub-carriers may only be able to support lower order modulation schemes (e.g., QPSK), thereby reducing the effective throughput that can be achieved with the affected sub-carriers.

Adverse effects of GDV can manifest in one or more forms of service degradation. For example, transmissions made on channels susceptible to high GDV may be more subject to error and/or require more retransmissions to achieve success than those made on channels characterized by lower GDV. Service degradation due to GDV can be particularly problematic for uplink transmission of UE-initiated communications, because these involve RAC requests that may be subject to contention among multiple UEs transmitting requests on the random access channel. Thus, a UE transmitting on a higher GDV uplink channel may need to make more RAC requests in order to have successful communications, each RAC request being subject delayed response for a channel grant or even failure due to contention.

It can happen that when a UE attaches to or registers in a service provider's network, it is assigned to receive access in a portion of the service provider's RF spectrum that is more prone to GDV than one or more other portions of the service provider's RF spectrum. For example, a network provider may provide wireless access in multiple RF bands that occupy one or more LTE bands. In order to help mitigate or minimize leakage of RF power between adjacent bands in the RF spectrum (e.g., across band "edges" separating adjacent bands), the transmitter elements of the network—including base stations and UEs—may implement various filters to shape or suppress transmission power near band edges. As a result, sub-carriers near band edges may be subject to higher GDV than those further from band edges. There may be other factors as well that cause certain sub-carriers to be subject to higher GDV than other. This, in turn, can lead to unequal and/or non-uniform distribution of GDV across the RF spectrum of a service provider's network. Depending on which portion of the service provider's RF spectrum a UE is assigned when it registers or attaches, the UE's transmissions may therefore be subject to more or less GDV. Once the assignment is made, the UE said to be "camped" on a particular portion of the RF spectrum—e.g., camped on a particular RF band, or on a particular set of sub-carriers.

In conventional operation under LTE, a given UE that is camped on high GDV channels or sub-carriers competes for access on the RAC with UEs camped on lower GDV channels or sub-carriers without any accounting for the given UE's disadvantage due to its transmissions being subject to higher GDV. As noted above, this can adversely affect the service received by the given UE. It would therefore be desirable to be able to recognize uplink RAC requests from UEs that are subject to high uplink GDV, and compensate this disadvantage by prioritizing their requests. Accordingly, example embodiments herein provide a method and system for accounting for group delay variation when responding to uplink RAC requests from UEs.

Hence, in one respect, various embodiments of the present invention provide, in a base station of a wireless communication network, a method comprising: receiving (i) a first random access channel (RAC) request from a first user equipment device (UE) assigned to operate in a first frequency band of the wireless communication network and (ii) a second RAC request from a second UE assigned to operate in a different, second frequency band of the wireless communication network, the first and second RAC requests being received within a threshold time interval of each other, and both being for uplink communications; making a determination that the first frequency band is more susceptible to group delay variation based impairments than the second frequency band; and in response to the determination, prioritizing an uplink channel grant of the first RAC request over an uplink channel grant of the second RAC request.

In another respect, various embodiments of the present invention provide a base station comprising: one or more transceivers and filters configured to operate in at least both of a first frequency band of a wireless communication network and a different, second frequency band of the wireless communication network, wherein the first frequency band is more susceptible to group delay variation based impairments than the second frequency band; one or more processors; and tangible, non-transitory computer readable memory having instructions stored thereon that, upon execution by the one or more processors, cause the base station to carry out operations including: receiving (i) a first random access channel (RAC) request from a first user equipment device (UE) assigned to operate in the first frequency band and (ii) a second RAC request from a second UE assigned to operate in the second frequency band, the first and second RAC requests being received within a threshold time interval of each other, and both being for uplink communications; and in response to the first frequency band being more susceptible to group delay variation based impairments than the second frequency band, prioritizing an uplink channel grant of the first RAC request over an uplink channel grant of the second RAC request.

In still another respect, various embodiments of the present invention provide a non-transitory computer readable medium having stored thereon instructions that, upon execution by one or more processors of a base station, cause the base station to carry out operations, wherein the base station is configured to operate in at least both of a first frequency band of a wireless communication network and a different, second frequency band of the wireless communication network, wherein the first frequency band is more susceptible to group delay variation based impairments than the second frequency band, and wherein the operations include: receiving (i) a first random access channel (RAC) request from a first user equipment device (UE) assigned to operate in the first frequency band and (ii) a second RAC request from a second UE assigned to operate in the second frequency band, the first and second RAC requests being received within a threshold time interval of each other, and both being for uplink communications; and in response to the first frequency band being more susceptible to group delay variation based impairments than the second frequency band, prioritizing an uplink channel grant of the first RAC request over an uplink channel grant of the second RAC request.

This overview is illustrative only and is not intended to be limiting. In addition to the illustrative aspects, embodiments, and features described herein, further aspects, embodiments, and features will become apparent by reference to the figures and the following detailed description. The features and advantages of the disclosed systems and methods, as well as other aspects, advantages, and alternatives will become apparent to those of ordinary skill in the art by reading the following detailed description, with reference where appropriate to the accompanying drawings.

DETAILED DESCRIPTION

The systems and methods described herein are set forth only as examples. As such, those skilled in the art will appreciate that other arrangements and element (e.g., machines, interfaces, functions, orders, and groupings of functions) can be used instead, and that some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For example, one or more processors executing instructions stored in memory may implement one or more of the features and functions described herein.

Figure 1:
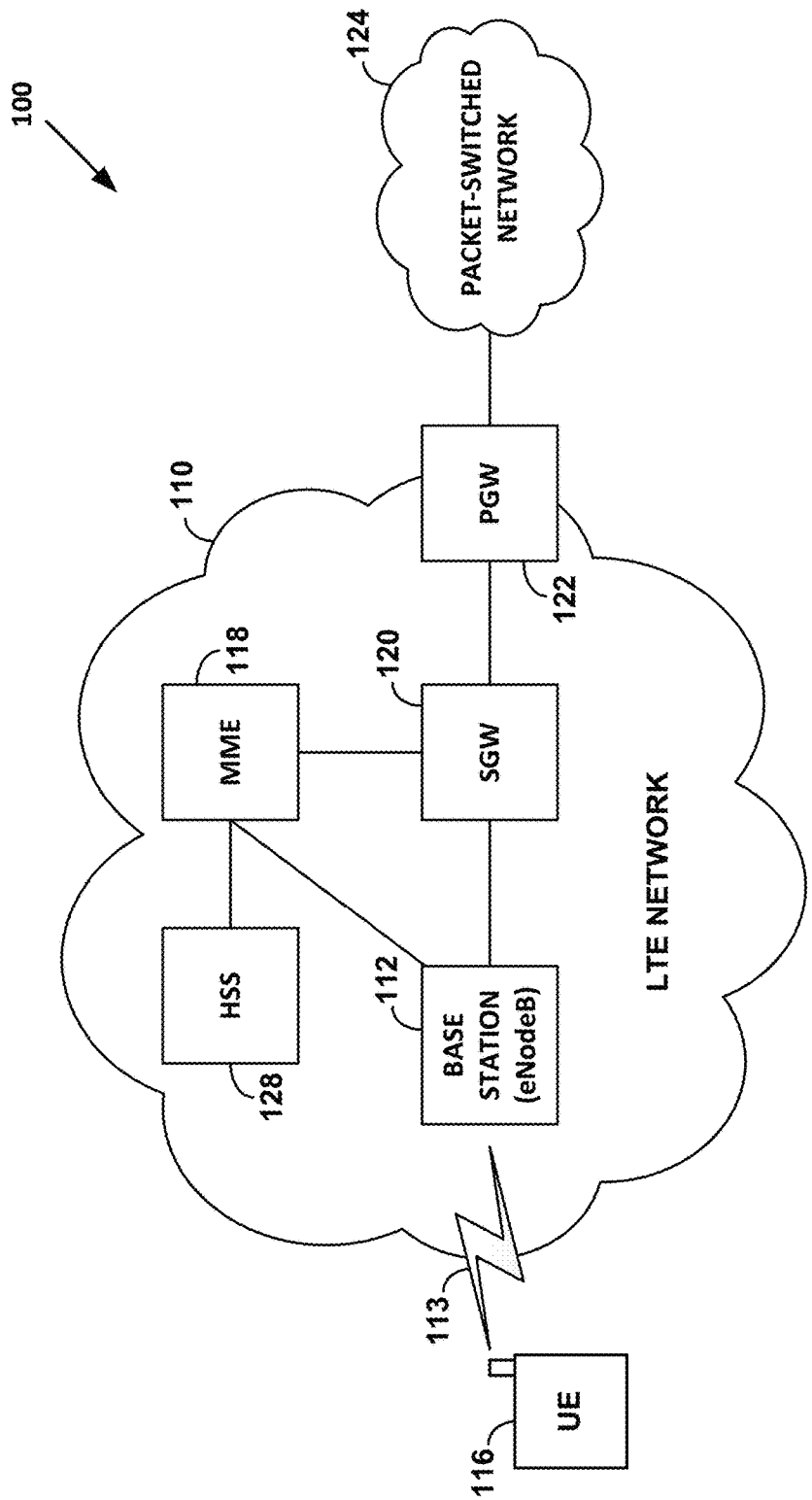
FIG. 1 is a simplified network diagram of an example wireless communications network according to some embodiments of the disclosed systems and methods.

Referring to the drawings, FIG. 1 is a simplified block diagram of a wireless communication system or network 100 in which an example of the present method can be implemented. In a typical deployment, the wireless network 100 could be operated by a wireless service provider, which in turn may own or be licensed to operate in one or more portions of RF spectrum. More particularly, within the RF spectrum, different wireless service providers may be allocated different, non-overlapping carrier bands for providing wireless services. Under LTE, for example, carriers are allocated to service providers in different RF ranges and in non-overlapping bands of 1.4 MHz, 3 MHz, 5 MHz, 10 MHz, 15 MHz, and/or 20 MHz. Some service providers may have more than one carrier band allocation. Contiguous groupings of carriers can be further organized in frequency within different specified "band channels" used to subdivide the RF spectrum at a higher level than individual carriers. For example, the band channel designated "Band 41" spans frequencies 2,496 MHz to 2,690 MHz, for a total of 194 MHz, and is subdivided into a number of carriers. A service provider's wireless network could then support one or more types of service in each of its one or more portions of RF spectrum.

By way of example, the wireless network 100 in FIG. 1 is taken to include a representative LTE radio access network (RAN) 110 including an example LTE base station 112 (also referred to as an eNodeB), which radiates to provide a wireless coverage area defining an LTE air interface 113 through which the base station 112 may serve one or more UEs. The base station 112 is then shown coupled with core LTE network infrastructure, which may include a mobility management entity (MME) 118, a serving gateway (SGW) 120 and a packet-data network gateway (PGW) 122 providing connectivity with a packet-switched network 124 such as the Internet. Further, the MME is configured to communicate with a Home Subscriber Server (HSS) 28, which may store account and service profiles for various UEs. Shown within coverage of the base station 112 is then a representative UE 116. In practice, the LTE access network may be operated by a cellular wireless service provider, and the UE may subscribe to service of that provider.

In practice, many of these network components may be owned and/or operated by or for a telecommunications service provider such as a cellular wireless carrier and may physically sit as nodes on a core packet network operated by the service provider. Communications over the various illustrated interfaces may thus pass between various network entities as packet-based communications, such as IP communications for instance, through the core network.

With the example arrangement shown, when of the UE 116 enters into coverage of network, the UE may transmit an attach request over the air interface 113 to the base station 112. This attach request may then cause the network to establish for the UE one or more default bearers.

In particular, when the base station 112 receives this initial attach request from the UE, the base station may forward the attach request to the MME 118. The MME may then authenticate and authorize the UE and obtain from HSS 128 an indication of one or more application services to which the UE subscribes and may store an indication of those services in a context record for the UE, keyed to a UE identifier such as an International Mobile Subscriber Identity (IMSI) for instance. For each of various services, the MME may then allocate for the UE a respective bearer ID (e.g., evolved packet system (EPS) bearer ID), which the MME may store in the UE context record in correlation with an identity of the base station for instance. Further, for each such service, the MME then engage in signaling with the SGW 120 and the base station 112 to set up a respective bearer, defining a logical tunnel over which bearer data can flow to and from the UE.

For instance, assuming the UE is authorized for general packet-data service, the MME may engage in signaling with the SGW 120 and the base station 112 to set up for the UE a default bearer to carry general packet-data communication traffic. Further, if the UE is authorized for VoIP service, the MME may also engage in signaling with the SGW and the base station to set up for the UE another default bearer to carry VoIP call setup signaling (e.g., SIP signaling). Each of these bearers may have a corresponding level of service, such a quality of service class indicator (QCI) or other indication of the bearer's service level, which might be keyed to a service level agreement of the UE for instance.

The process of establishing each of these or other bearers may take various forms, the particular details of which are not necessarily critical for purposes of the present discussion. In a representative implementation, for instance, the MME may transmit to the SGW a create-session request, including in the request one or more parameters (e.g., a QCI value and/or an application service level identifier) indicating the service level and/or other type of bearer to be established and identifying the UE at issue (e.g., by IMSI). The SGW may then responsively send a corresponding create-session request to the PGW 122. Upon receipt of the create-session request, the PGW may then query a policy server for authorization to establish the requested bearer for the UE.

With approval, the PGW may then record an access bearer ID for the UE and may work with the SGW to establish a communication tunnel corresponding with the bearer. In particular, the PGW may transmit to the SGW a create-session response indicating the bearer being established (e.g., providing a bearer ID, CQI, UE identifier, etc.) and informing the SGW of an endpoint identifier (e.g., port and/or address) at the PGW to be used for the bearer. The SGW may then transmit an acknowledgement to the PGW, similarly informing the PGW of an endpoint identifier at the SGW to be used for the bearer. In this manner, the PGW and SGW will establish a tunnel for communicating with each other at their respective endpoint identifiers, and each correlate that tunnel with the bearer at issue, including bearer type parameters such as service level for instance.

The SGW may then transmit to the MME a create-session response that provides any applicable service level parameters for the bearer and that informs the MME of an endpoint identifier at the SGW to be used for communication between the SGW and the base station. The MME may then transmit to the base station an attach-accept message, providing any applicable service level parameters for the bearer and informing the base station of the endpoint identifier at the SGW to be used for communication between the SGW and the base station.

Upon receipt of the attach-accept message from the MME, the base station may then transmit over the air interface 113 to the UE a Radio Resource Control (RRC) Connection Reconfiguration message that specifies a radio-bearer ID and any applicable service level parameters, as well as an attach-accept message. The UE may then store the bearer ID and any applicable parameters and send an RRC Connection Reconfiguration Complete message to the base station, indicating setup of the radio-bearer for air interface communication between the UE and the base station.

Further, the base station may transmit to the MIME an attach-complete message, and the MME may transmit to the SGW a corresponding attach-complete message that informs the SGW of an endpoint identifier at the base station to be used for communication between the SGW and the base station. In this manner, the base station and SGW will have established a tunnel for communicating with each other at their respective endpoint identifiers, and each would correlate that tunnel with the bearer at issue, including bearer type parameters such as service level for instance.

Through this or another process, a bearer would thus be established for the UE, including a radio-bearer portion that extends over the air interface between the UE and the base station, and an access-bearer that extends between the base station and the SGW and between the SGW and the PGW. Each of the entities involved in communication over this bearer, including the UE, base station, SGW, and PGW for instance, may also maintain service level parameters for the bearer, so as to facilitate treating communications in an appropriate manner, such as with best-effort service level, guaranteed-bit-rate service level, or another service level for instance.

In establishing the radio-bearer over the air interface, the UE is assigned to one more particular portions of the service provider's RF spectrum for downlink and uplink communications. For example, under LTE a UE may be assigned a particular carrier band within a service provider's band channel. Then, when the UE and base station engage in active communications, one or more downlink and/or uplink air interface channels for the communications are first assigned by the base station from available channels within the carrier band to which the UE has been assigned. Customarily, the UE is said to be "camped" on those air interface channels. Thus, a UE's camped-on channels specify which portion of the RF spectrum it will use when it engages in active communications with its serving base station. Through the process of establishing bearers, different UEs may come to be camped on different portions of the service provider's spectrum. And with that, different UEs may be subject to different propagation characteristics, as discussed below.

In providing air-interface coverage, the base station 112 may operate on one or more particular carrier frequency bands within the one or more portions of the service provider's RF spectrum, and may define a limited extent of air interface resources for carrying signaling and bearer data between the base station and served UEs. Under LTE, for instance, the one or more particular carrier bands in frequency may be divided into physical resource blocks (PRBs) spanning a continuum of 1 millisecond transmission time intervals (TTIs) in time and specific sets of sub-carriers in frequency. Each TTI is further subdivided into 14 symbol time of 67 μs each, and each sub-carrier set includes 12 sub-carriers, each 15 kHz in width. In this scheme, each PRB is includes 14×12 physical resource elements, with the resource elements of the various PRBs in the TTI cooperatively defining various channels, including signaling channels physical shared channels for carrying bearer data (e.g., application-layer user data) between the base station and served UEs. In practice, each resource element in the shared channel can carry a modulation symbol that represents a certain number of bits of data, with the number of bits, depending a modulation scheme selected for the UE at issue.

Under LTE, when the base station 112 allocates one or more LTE resource blocks for data transmissions on the downlink from the base station to a UE and/or on the uplink from a UE to the base station, it does so within a frequency band on which the UE is camped. Typically, base station 112 allocates uplink and/or downlink resource blocks for data transmissions in response to determining a need to transmit data between the base station 112 and a particular UE, such as the UE 116. The determination may be based on instructions or data forwarded from a serving gateway and/or application server (e.g., multimedia application servers, Internet application servers, or similar) and/or a request received from a UE to initiate an uplink communication. In particular, a UE may transit a RAC request to its serving base station to obtain an uplink channel.

Within a given band channel, carriers are arranged contiguously in frequency, such that any two adjacent carriers are separated by a common band edge. One consequence of this arrangement is that transmission power near the edge of one carrier can "leak" into the adjacent carrier across the common edge between the two carriers. Such power leakage can result in interference and correspondingly some degree of service degradation. The impact of power leakage across band edges can be mitigated to some extent by the guard bands at the band edges, which serve as buffers of nominally power-free spectrum. But power leakage can still be problematic depending, for example, on the transmission power level being used on the sub-carriers of the resource blocks— particularly those resource blocks nearest the band edges.

Figure 2:
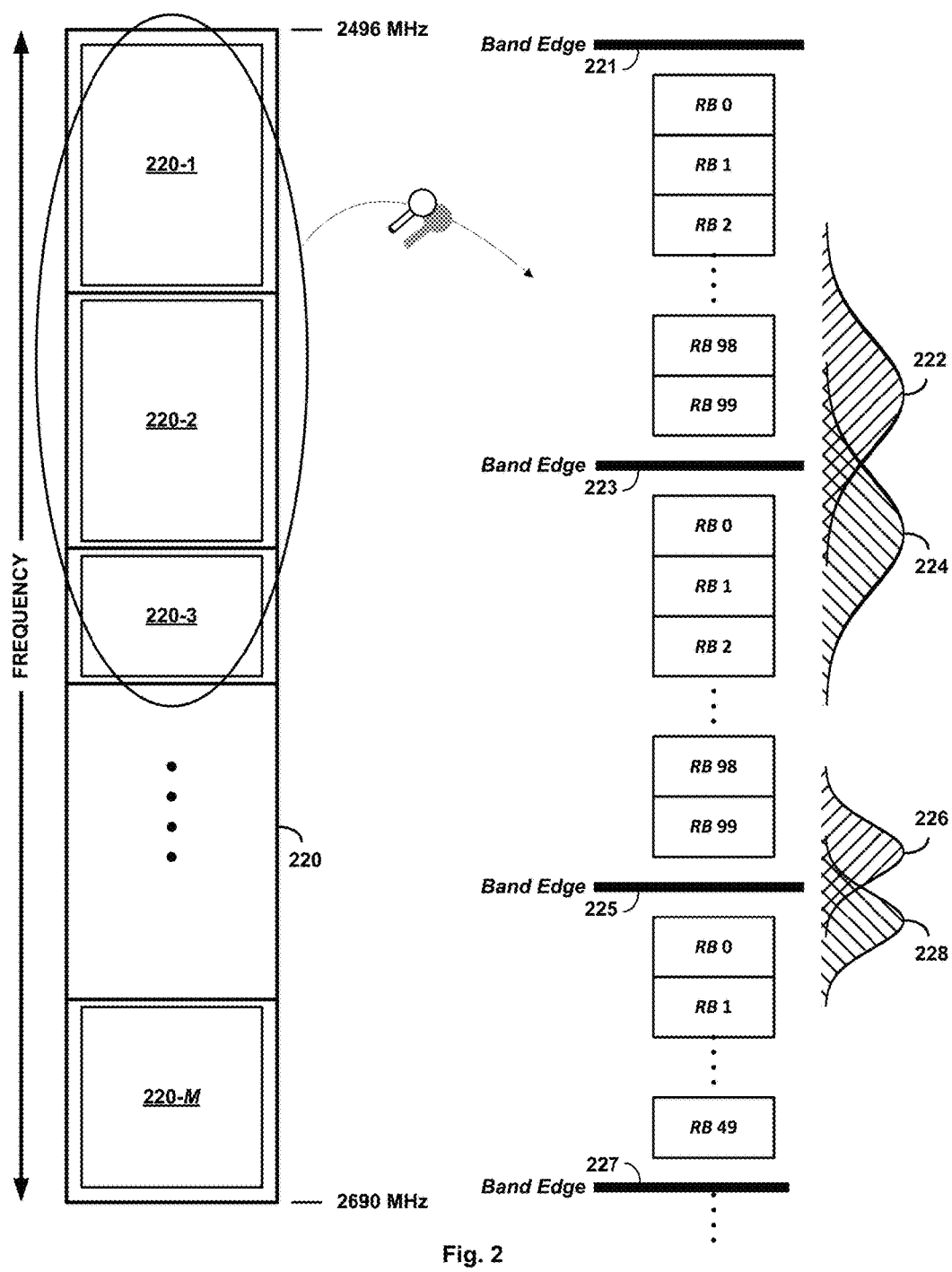
FIG. 2 is a conceptual illustration of wireless carrier bands of a band channel, in accordance with an example embodiment.

FIG. 2 is a conceptual illustration of wireless carrier bands of a band channel, band edges, and cross-carrier power leakage. The left side of FIG. 2 shows, by way of example, a band channel 220 spanning frequencies 2,496 MHz to 2,690 MHz, for a total of 194 MHz. Within the band channel 220, four representative carriers 220-1, 220-2, 220-3, and 220-M are shown. Vertical ellipses between carriers 220-3 and 220-M represent additional carriers not expressly shown in FIG. 2. The right side of FIG. 2 shows an expanded view of the first three carriers 220-1, 220-2, and 220-3, depicting (in frequency space) representative resource blocks in each carrier, as well as conceptually marking band edges. Specifically, a band edge 221 marks the minimum frequency of the carrier 220-1, which, by way of example, is also a lower-frequency boundary of the band channel 220. A band edge 223 marks a common boundary between the maximum frequency of the carrier 220-1 and the minimum frequency of the carrier 220-2. Similarly, a band edge 225 marks a common boundary between the maximum frequency of the carrier 220-2 and the minimum frequency of the carrier 220-3; and a band edge 227 marks a common boundary between the maximum frequency of the carrier 220-3 and the minimum frequency of the next (but unspecified) carrier (represented by vertical ellipses beneath the band edge 227).

Also by way of example in FIG. 2, the carrier 220-1 has a bandwidth of 20 MHz, as signified by the 100 resource blocks numbered RB 0, RB 1, RB 2, . . . , RB 98, RB 99, where the ellipses represent 95 resource blocks between RB 2 and RB 98 that are not expressly shown for the sake of brevity in the figure. Similarly, the carrier 220-2 also has a bandwidth of 20 MHz, again as signified by the 100 resource blocks numbered RB 0, RB 1, RB 2, . . . , RB 98, RB 99. The carrier 220-3 has, by way of example, a bandwidth of 10 MHz, as signified by the 50 resource blocks numbered RB 0, RB 1 . . . , RB 49.

Power leakage between carriers is represented to the right of the displayed resource blocks by conceptual graphical plots of power as a function of frequency. In the example illustration, a power plot 222 represents transmission power originating in one or more sub-carriers of the carrier 220-1. Similarly, a power plot 224 represents transmission power originating in one or more sub-carriers of the carrier 220-2. As a visual cue, the two plots are shaded with oppositely-slanted hatch marks. Power leakage is represented by a region where the plots overlap, depicted with slanted cross-hatching in the figure. It should be understood that the form of the illustration in FIG. 2 is conceptual, and that any apparent symmetry of cross-carrier leakage is not necessarily intended to imply or suggest such symmetry in practice.

A similar conceptual representation of power leakage is illustrated with partially overlapping power plots 226 and 228 near the band edge 225 between the carriers 220-2 and 220-3. Namely, in the overlap region of the power plots 226 and 228, at least some of the power in the carrier 220-2 near the band edge 225 originates from sub-carriers in the carrier 220-3; and in the overlap region, at least some of the power in the carrier 220-3 near the band edge 225 originates from sub-carriers in the carrier 220-2.

In order to help prevent or limit transmission power from leaking across carrier bands, base station 112 and the UE 116 generally employ band-pass filters to pass the configured frequency range (i.e., the pass band of the filter), and band-stop filters to block frequencies outside of the configured range (as well as amplifiers to amplify RF signals). For example, in some embodiments, the base station 112 or UE 116 may be configured with filters that pass an entire LTE band (e.g., LTE Band 41) and block frequencies outside of the band. In other embodiments, base station 112 or UE 116 may be configured with filters that pass a portion of an LTE band (e.g., a 50 MHz range of frequencies within LTE Band 41), and block frequencies outside of the desired portion the LTE band (e.g. outside of the desired 50 MHz frequency range). Other filter arrangements are possible as well.

While filters can be useful in limiting transmission power leakage and resultant interference, they can also impart frequency-dependent effects that lead to GDV among signal carried on sub-carriers that are subject to filtering. Since filters can be configured in a frequency-dependent manner, for example according to carrier and/or proximity to carrier band edges, different band channels of a service provider's RF spectrum may be subject to different degrees of GDV. For example, band channels near the edges of a carrier band are typically subject to higher GDV than those further from the edges. As a consequence, transmissions of a UE that is camped on a high GDV band channel will be subject to higher GDV than those of a UE camped on a lower GDV band channel. Transmissions subject to higher GDV will generally have a higher rate of failure and/or require more attempts to achieve success than those subject to lower GDV. This is because higher GDV will tend to introduce more timing imprecision among the sub-carriers allocated for transmission.

More specifically, decoding of received resource blocks requires a high degree of time alignment of signals received across the sub-carriers of the resource blocks. However, GDV tends to reduce time alignment, and with it the ability of a receiver to decode incoming signals. Thus, signals received at a base station from a UE camped on high GDV channels will therefore be more susceptible to decoding errors than those received from a UE camped on lower GDV channels. A UE camped on high GDV channels may have to transmit at a lower data rate and/or make more retransmissions than a UE camped on lower GDV channels.

As described above, when a particular UE seeks to acquire an uplink channel for data transmission, it transmits a RAC request to the eNodeB. Depending on the availability of uplink resources, the eNodeB may respond by granting the particular UE's request for an uplink channel. Such a response is referred to as an "uplink grant." Since the random access channel is shared among UE being served by the eNodeB, and RAC requests can be made at any time by any, the RAC request of the particular UE may be subject to contention on the shared and possible delay at the eNodeB. Consequently, the UE's uplink communications may be subject to latency (or other possible degradation) due to the random access process. The degree of latency (or degradation) may depend on traffic load (e.g., number of UEs being served by the eNodeB), as well as other factors. In any case, uplink grants apply to the channels on which the requesting UEs are camped.

For a UE camped on high GDV uplink channels, the conventional random access process can exacerbate service impairments due to the adverse effects of GDV described above. For example, if high GDV causes an uplink user data transmission to be received in error at the eNodeB, then the UE may have to retransmit at least part of the user data, which may then involve a RAC request by the UE. In conventional operation, the UE may then have to "compete" with other UEs making concurrent RAC requests, which can add further delay to the retransmission process. Similarly, if high GDV causes the UE to transmit at a lower data rate than it might if it were camped on low GDV channels, the UE may need to make more RAC requests to complete an uplink data transfer. Again, conventional RAC contention may introduce additional latency.

In order to help mitigate or reduce the combined impact of high GDV and random access delays for uplink channel grants, a base station can take account of the channels on which its served UEs are camped when processing RAC requests from the served UEs and making uplink grants to the served UEs. More particularly, a base station can determine the degree of GDV to which its served UEs are subject, and responsively prioritize RAC requests from those UEs camped on high GDV channels. Doing so can help ensure that those UEs camped on high GDV channels receive uplink grants with minimum or at least reduced delay.

In accordance with an example embodiment in an LTE network, an eNodeB can determine a severity of group delay or group delay variation for served UEs based on which channels the UEs are camped on. Referring again to FIG. 2, for example, the carrier 220-1 has one edge that coincides with the 2,496 MHz edge of the band channel 220. A UE camped on channels of the carrier 220-1 may be experience high GDV because it will have to transmit on sub-carriers that are subject to filtering aimed at suppressing power leakage across the 2,496 MHz edge. Conversely, a UE camped on channels of the carrier 220-3 might experience lower GDV since can transmit on carriers further from the 2,496 MHz edge, and therefore less subject to the effects of filtering that may enhance GDV. These GDV characteristics of different carriers can be generally known to eNodeBs, as well as other network elements, of a wireless network. Thus, when UEs attach to the network or register with an eNodeB, the eNodeB will assign the UEs to respective carriers. In doing so, the eNodeB can therefore determine relative levels of GDV that different UEs will experience when they transmit on their respective uplinks.

When the eNodeB receives multiple RAC requests from served UEs within a threshold time interval, it can prioritize ones from UEs camped on high GDV channels over those from UEs camped on lower GDV channels. In an example embodiment, the threshold interval could be an average time for processing RAC requests, where the time for processing a given request is an interval from receipt of the request to uplink grant (or denial, in the event that a request cannot be granted, e.g., due to unavailability of resources). The threshold time interval can be considered as a concurrency window. That is, RAC requests received within the threshold time interval can be considered has having been received concurrently, or at least nearly so, for the purposes of prioritizing among them.

Prioritizing an uplink grant can correspond to processing one RAC request ahead of another, even if the prioritized request was not received first. For example, if a first UE and a second UE both transmit respective first and second RAC requests to a common serving eNodeB such that the first and second requests are received at the eNodeB within the threshold time interval, then the eNodeB will prioritize its uplink grants based on the relative GDV experience by the first and second UEs. Thus, assuming for the sake of illustration that the first UE is camped on channels with higher GDV than those on which the second UE is camped, the eNodeB will grant an uplink channel to the first UE before doing the same for the second UE, regardless of which of the first and second RAC requests was received earliest. By doing so, the eNodeB helps reduce latency for the first UE, and helps compensate for possible adverse effects of the higher GDV experienced by the first UE.

In accordance with example embodiments, a RAC request from a UE can be a request to initiate a new communication, such as a new session, a new call, or a new data transfer (e.g., data upload to the network or to a device connected with the network). In this case, giving priority to a UE camped on high GDV channels can help compensate for possibly reduced data rates imposed by the high GDV. For example, the UE may have to use a lower modulation scheme to accommodate the high GDV.

Also in accordance with example embodiments, a RAC request from a UE can be a request for retransmission to correct or complete a previous unsuccessful or partially successful transmission. In this case, giving priority to a UE camped on high GDV channels can help reduce latency that might otherwise compound a lower success rate of transmissions that are the high GDV.

In practice, retransmission to make up for transmission errors can be carried out according to one or more retransmission schemes. For example, under LTE and other air interface protocols, retransmissions can be made according to a hybrid automatic retransmission request ("HARQ") protocol, in which data units, such as packets, are subdivided into sub-units that are transmitted sequentially from a sender to a receiver. The receiver responds to each successfully received sub-unit by transmitting a positive acknowledgement ("ACK"), and responds to each unsuccessfully received sub-unit by transmitting a negative acknowledgement ("NACK"). The sender responds to each NACK by resending one or more of the unsuccessfully received data units. Each sub-unit also includes some form of forward error correction data.

Various implementations of HARQ schemes may be used. For example, some may involve transmitting all sub-units in without waiting for ACK or NACK, and then retransmit only upon receiving NACKs. Other schemes might involve transmitting each sub-unit one at a time, and waiting for an ACK or NACK until transmitting the next sub-unit of a sequence. In still other schemes, the time timing is fixed between transmitting sub-units, processing them at the receiver, responding with an ACK or NACK, and sending or resending a sub-unit. In yet other schemes, a RAC request or other type of random access request may be used for each HARQ retransmission. Example embodiments of prioritizing RAC request from UEs camped on high GDV channels can be applied to help enhance the performance and outcome of RAC-request-based HARQ schemes.

Figure 3:
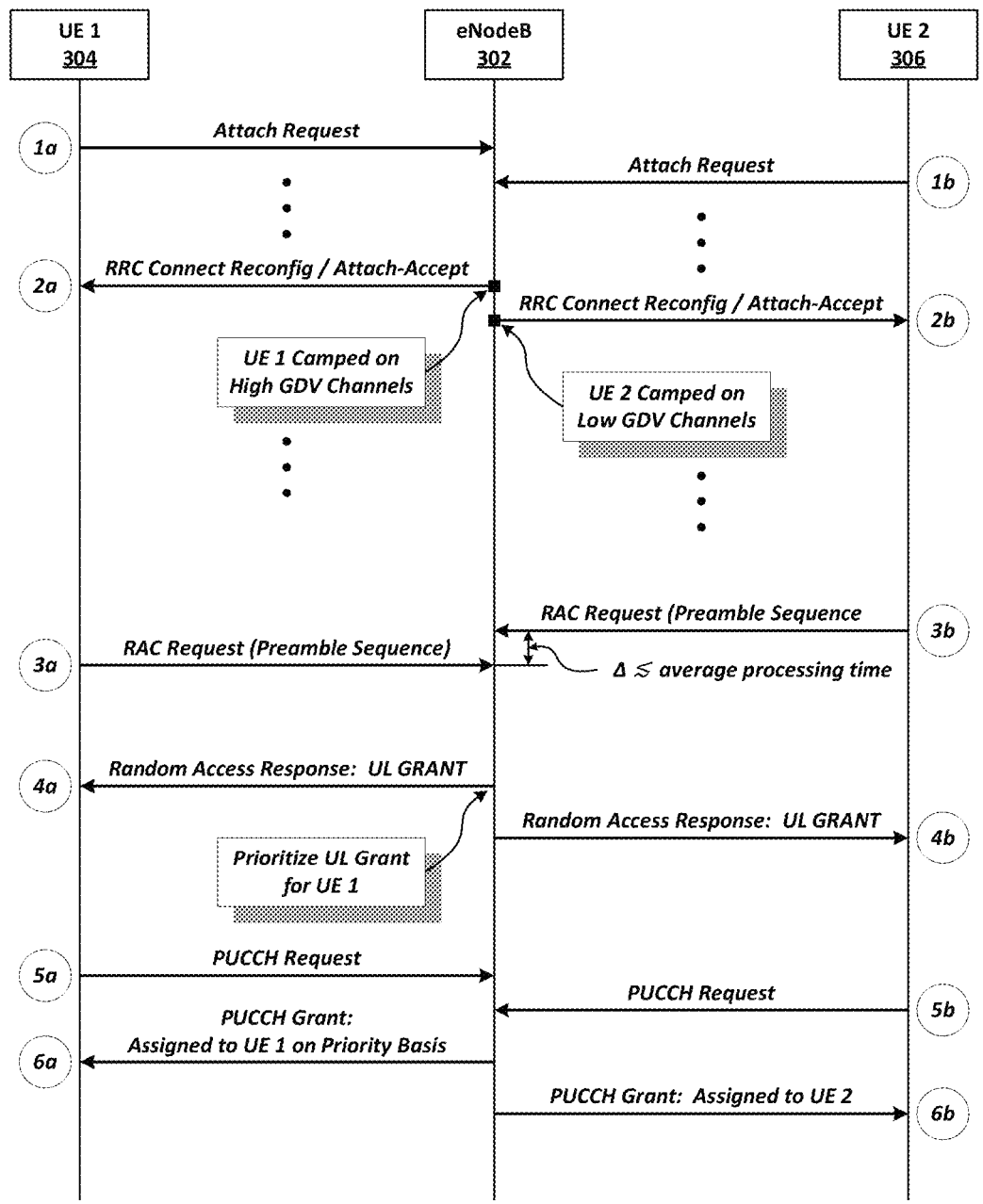
FIG. 3 is an example call flow depicting aspects of some embodiments of the disclosed systems and methods.

FIG. 3 is an example of a simplified call flow depicting aspects of some embodiments of the disclosed systems and methods. By way of example, the example call flow involves a first UE 304, labeled "UE 1," a second UE 306, labeled "UE 2," and a common serving eNodeB 302. Messages between UE 1 and the eNodeB 302 and between UE 2 and the eNodeB 302 are displayed in relative timing order, with time increasing downward in the figure. Each message is labeled with a sequence number (1, . . . , 6) and a letter, "a" for messages between UE 1 and the eNodeB 302, and "b" for messages between UE 2 and the eNodeB 302. Vertical ellipses indicate passage of some unspecified amount of time between messages.

At message 1a, UE 1 transmits an attach request to the eNodeB 302, and at message 1b, UE 2 transmits an attach request to the eNodeB 302. For purposes of illustration and by way of example, message 1a is received before message 1b at the eNodeB 302.

At message 2a, the eNodeB responds to UE 1 by sending a RRC Connect reconfiguration, including an attach accept. At this point, UE 1 is camped on assigned channels, which by way of example are high GDV channels, as indicated by the note in the figure. As described above in connection with FIG. 1, there are typically other network entities and messages involved in achieving this attach state (e.g., the SGW 120, PGW 122, MME, 118, and HSS 128). However, for the sake of brevity in FIG. 3, only the attach request 1a and the ultimate response 2a are shown. There is no loss in generality in this abbreviated depiction. Similarly, at message 2b, the eNodeB responds to UE 2 by sending a RRC Connect reconfiguration, including an attach accept. At this point, UE 2 is camped on assigned channels, which by way of example are low GDV channels, as indicated by the note in the figure. Again, only the attach request 1b and the ultimate response 2b are shown.

Both UE 1 and UE 2 can now send RAC requests for respective uplink channels. Thus, at 3a, UE 1 sends a RAC request to the eNodeB 302. And at 3b, UE 2 sends a RAC request to the eNodeB 302. As indicated, both RAC requests include a respective preamble sequences. By way of example, the RAC request 3a is received after the RAC request 3b, but within a threshold time interval Δ, as indicated.

In accordance with example embodiments, in response to determining that UE 1 is camped on high GDV channels while UE 2 is not, the eNodeB 302 prioritizes its response to the RAC request 3a by sending an uplink (UL) grant in message 4a to U 1. Then, after issuing the UL grant to UE 1, the eNodeB 302 issues its response to the RAC request 3b by sending an uplink (UL) grant in message 4b to U 2. Thus, a UL grant is issued to UE 1 before it one is issued to UE 2, even though the RAC request from UE 2 was received first (though both RAC requests were received within A). At this point, both UEs have their uplink channels allocated.

At message 5a, UE 1 then sends a PUCCH request to the eNodeB 302, and receives a PUCCH grant, assigned on a priority basis, in message 6a from the eNodeB 302. Finally, at message 5b, UE 1 sends a PUCCH request to the eNodeB 302, and receives a PUCCH grant in message 6b from the eNodeB 302.

The example call flow in FIG. 3 illustrates how priority processing and channel assignment is carried out by the eNodeB based on knowledge or determination that a UE (UE 1 in this illustration) is camped on high GDV channels. It will be appreciated that there may be other messages and other specific call flows that implement priority processing for UEs camped on high GDV channels, and the Figure depicts just one example.

Figure 4:
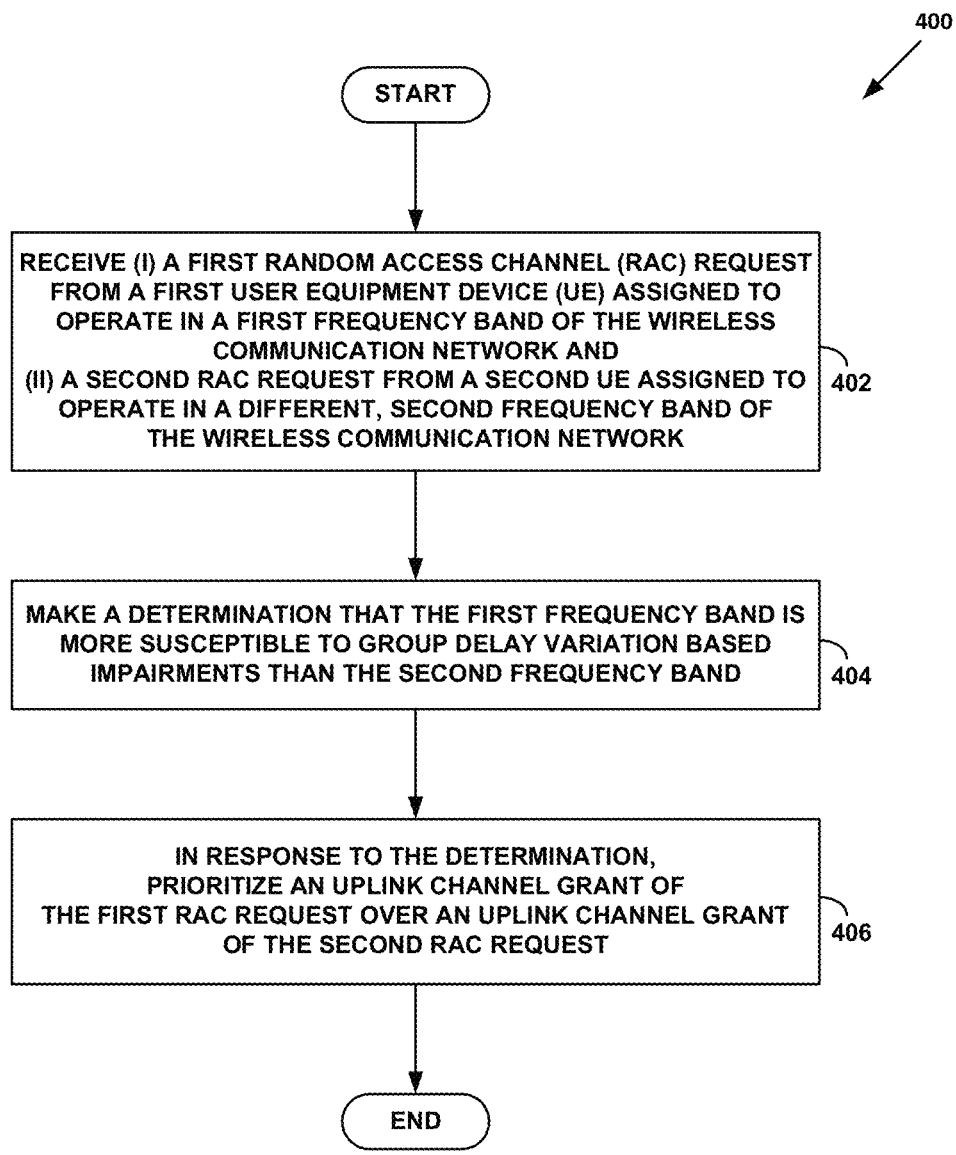
FIG. 4 is an example flow chart depicting an example method, in accordance with example embodiments.

FIG. 4 is an example flow chart depicting an example method 400, in accordance with example embodiments. Illustrative methods, such as method 400, may be carried out in whole or in part by a base station, such as by the base station 112 shown in FIG. 1. By way of example, the method 400 can be implemented as machine language instructions that can be stored on non-transitory machine-readable media (e.g, solid state memory, magnetic disk, etc.), and that when executed by one or more processors of a base station to cause the base station to carry out operations, steps, and/or functions of the method. In particular, the method 400 involves a method carried out by a base station configured for communicating with one or more UEs, including a first UE and a second UE.

As shown by block 402 in FIG. 4, the method 400 entails receiving (i) a first random access channel (RAC) request from a first user equipment device (UE) assigned to operate in a first frequency band of the wireless communication network and (ii) a second RAC request from a second UE assigned to operate in a different, second frequency band of the wireless communication network. Both the first and second RAC requests are for uplink communications, they are received within a threshold time interval of each other.

As shown by block 404 in FIG. 4, method 400 next entails making a determination that the first frequency band is more susceptible to group delay variation (GDV) based impairments than the second frequency band. This determination could be made upon receipt of the first and second RAC requests, or prior to receiving them. For example, it could be made when the two UEs register with or attach to the base station.

Finally, as shown by block 406 in FIG. 4, method 400 next entails, in response to the determination, prioritizing an uplink channel grant of the first RAC request over an uplink channel grant of the second RAC request. That is, the base station may compensate for the higher GDV to which the first UE is subject to by giving priority the first UE's RAC request.

In further accordance with example embodiments, the method 400 can further entail assigning the first UE to operate in the first frequency band in response to receiving a request for service from the first UE, prior to receiving the first RAC request. Similarly, the second UE could be assigned to operate in the second frequency band in response to receiving a request for service from the second UE, prior to receiving the second RAC request. In an example embodiment, the first and second frequency bands can be distinct, non-overlapping radio frequency (RF) intervals, each comprising a set of sub-carrier frequencies. In this configuration, assigning the first UE to operate in the first frequency band could the entail designating the sub-carrier frequencies of the first frequency band for allocation in particular sub-sets when granting RAC requests from the first UE for uplink communications. Similarly, assigning the second UE to operate in the second frequency band could then entail designating the sub-carrier frequencies of the second frequency band for allocation in particular sub-sets when granting RAC requests from the second UE for uplink communications.

In accordance with example embodiments, the threshold time interval could correspond to an average processing time for the base station to process RAC requests from UEs it is serving, where the processing time for any given RAC request is an interval from receipt of the given RAC request until one of an uplink channel grant or an uplink channel denial. Thus, receipt of the first and second RAC requests could be nearly concurrent, at least to within the accuracy of the average processing time.

In accordance with example embodiments, receiving the first RAC request from the first UE could entail receiving a RAC request from the first UE for either an uplink channel for a new uplink transmission or an uplink channel for at least a partial repeat of an at least partially unsuccessful, previous transmission. In the latter case, the RAC request could be part of a HARQ scheme in which retransmission requests are made in RAC requests.

In accordance with example embodiments, prioritizing the uplink channel grant of the first RAC request over the uplink channel grant of the second RAC request could entail granting an uplink channel to the first UE in response to the first RAC request before granting an uplink channel to the second UE in response to the second RAC request. Thus, the base station would prioritize its response to the first RAC request by ensuring a grant for an uplink channel to the first UE before doing so for the second UE.

In accordance with example embodiments, the method 400 could further entail receiving a third RAC request from a third UE assigned to operate in the second frequency band of the wireless communication network, where the third RAC request is also for uplink communications and is received within the same threshold time interval as the first and second RAC requests. Then in response to the determination, the base station could prioritize the uplink channel grant of the first RAC request over an uplink channel grant of the third RAC request. Thus, prioritization of RAC requests for UEs camped on high GDV channels could apply to any two or more RAC requests received within the threshold time interval, where one of the requests is from a UE camped on high GDV channels.

In accordance with example embodiments, the base station could be an LTE eNodeB. In this configuration, making the determination could entail determining that sub-carriers of LTE resource blocks in the first frequency band are more susceptible to group delay variation based impairments than sub-carriers of LTE resource blocks in the second frequency band. Prioritizing the uplink channel grant of the first RAC request over the uplink channel grant of the second RAC request could the correspond to granting one or more uplink LTE resource blocks to the first UE in response to the first RAC request before granting one or more uplink LTE resource blocks to the second UE.

It will be appreciated that the example method 400 could each include alternate and/or additional steps, while still remaining within the scope and spirit of example embodiments herein.

Figure 5:
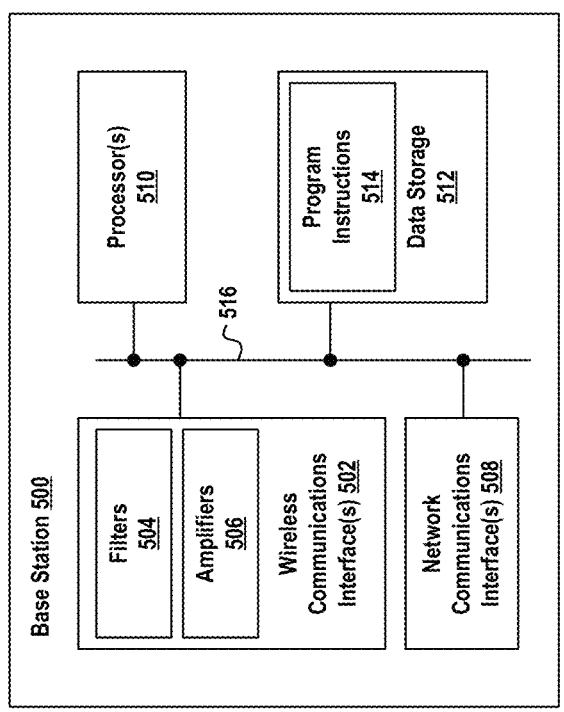
FIG. 5 is a simplified block diagram of an example base station according to some embodiments of the disclosed systems and methods.

FIG. 5 is a simplified block diagram of an example base station 500 according to some embodiments of the disclosed systems and methods, including, for example, base station 112 of FIG. 1. It will be appreciated that there can be numerous specific implementations of a base station, such as base station 500, in which the disclosed frequency allocation methods could be implemented. As such, base station 500 is representative of a means for carrying out frequency allocation, in accordance with the methods and steps described herein by way of example.

The example base station 500 includes one or more wireless communications interfaces 502, one or more network communications interfaces 508, one or more processors 510, and data storage 512, all of which may be coupled together by a system bus 516 or similar mechanism. In addition, the base station 500 may also include external storage, such as magnetic or optical disk storage (not shown). Variations from this arrangement are possible as well, including addition and/or omission of components, combination of components, and distribution of components in any of a variety of ways.

The base station components may be arranged to support wireless communications in a wireless communication network that is compliant with one or more of the variety of wireless air-interface protocols noted above, in addition to other protocols now known or later developed. In particular, the components of the example base station 500 are configured to support frequency allocation based on group delay variation in accordance with the example embodiments described herein.

The one or more wireless communications interfaces 502 may include one or more transceivers, amplifiers 506, filters 504, antennas, and other associated components that enable the base station 500 to engage in air interface communication with one or more wireless communications devices, such as UE 116 shown in FIG. 1, according to any of the air interface protocols described herein (e.g., CDMA, GSM, LTE, etc.). The one or more amplifiers 506 and filters 504 are configured to support transmissions within a configured frequency range on (1) the downlink (or forward link) from the base station 500 to a wireless communications device and (2) the uplink (or reverse link) from the wireless communications device to the base station 500. Some embodiments may use different frequency ranges for the uplink and downlink.

The one or more network interfaces 508 include physical network interfaces (e.g., optical, electrical) that enable the base station 500 to send and receive traffic directly or indirectly to/from other networks, such as the Public Switched Telephone Network (PSTN), the Internet, or other networks. The one or more network interfaces 508 may take the form of Ethernet network interface cards/ports, optical network interface cards/ports or other physical interfaces to one or more transmission networks that directly or indirectly connect the base station 500 to its neighboring base stations as well as to the PSTN, the Internet, and/or other networks.

The one or more processors 510 comprise one or more general-purpose processors (e.g., microprocessors) and/or one or more special-purpose processors (e.g., dedicated digital signal processors (DSPs), application specific integrated circuits (ASICs), etc.). The non-transitory data storage 512 comprises one or more volatile and/or non-volatile storage components, such as magnetic or optical memory or disk storage. Non-transitory data storage 512 can be integrated in whole or in part with the one or more processors 510, as cache memory or registers for instance. As further shown, non-transitory data storage 512 is equipped to hold program instructions 514. In some embodiments, one or more of the processors 510 and non-transitory data storage 512 may be integrated in whole or in part with one or more of the wireless communications interfaces 502 and/or network communications interfaces 508.

The program instructions 514 comprise machine language instructions that define routines and software program code executable by the one or more processors 510 (alone or in combination with the wireless communications interface(s) 502 and network communications interface(s) 508) to carry out various functions described herein. In particular, the program code 514, wireless communications interfaces 502, and network communications interfaces 508 may operate cooperatively to carry out one or more aspects of the frequency allocation methods described herein.

Figure 6:
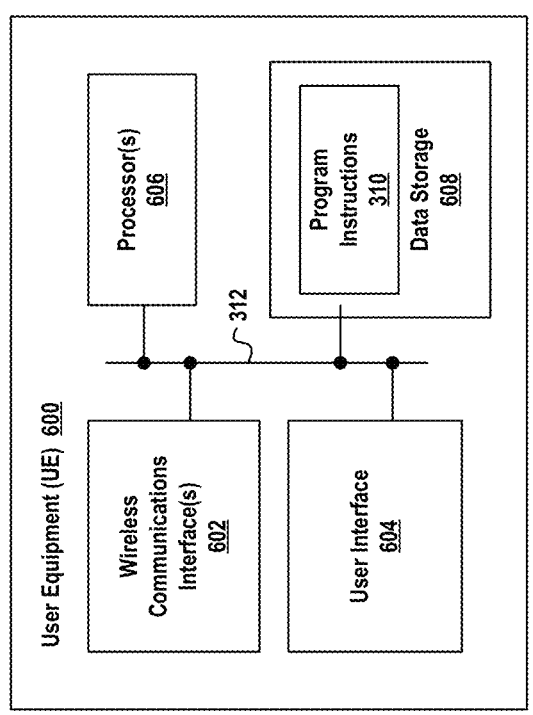
FIG. 6 is a simplified block diagram of an example UE according to some embodiments of the disclosed systems and methods.

FIG. 6 is a simplified block diagram of a UE 600 according to some embodiments of the disclosed systems and methods, including, for example, UE 116 shown in FIG. 1. The UE 600 is configured to operate in a communication system, such as the wireless communication system 100 of FIG. 1 for example, and may execute one or more functions described herein.

The UE 600 includes one or more wireless communication interfaces 602, one or more processors 606, a user interface 604, and non-transitory data storage 608 configured to store program instructions 604, all of which may be communicatively linked together by a system bus 612 or other similar mechanism. Variations from this arrangement are possible as well, including addition and/or omission of components, combination of components, and distribution of components in any of a variety of ways.

Wireless communication interface(s) 602 includes components (e.g., radios, antennas, communications processors) configured to engage in air interface communication within a configured frequency range of a base station. For example, the wireless communication interface 302 may include one or more antenna structures and chipsets arranged to support wireless communication according to one or more air interface protocols, such as the ones disclosed and described herein (e.g., CDMA, GSM, LTE) and perhaps others (e.g., WiFi, Bluetooth, etc.)

The one or more processors 606 include one or more general purpose processors (e.g., microprocessors) and/or special purpose processors (e.g., application specific integrated circuits or the like). In some embodiments, the one or more processors 606 may be integrated in whole or in part with the one or more wireless communication interfaces 602.

The non-transitory data storage 608 comprises one or more volatile and/or non-volatile storage components. The storage components may include one or more magnetic, optical, and/or flash memory components for example. In some embodiments, the non-transitory data storage 608 may be integrated in whole or in part with the one or more processors 606 and/or the wireless communication interface(s) 602. Additionally or alternatively, the non-transitory data storage 608 may be provided separately as a non-transitory machine readable medium.

The non-transitory data storage 608 may hold (e.g., contain, store, or otherwise be encoded with) program instructions 610 (e.g., machine language instructions or other program logic, markup or the like) executable by the one or more processors 606 to carry out the various functions described herein. The non-transitory data storage 608 may also hold reference data for use in carrying out various functions described herein, e.g., information relating to the UE's current GPS coordinates. In operation, a UE may periodically report its GPS coordinates to the base station.

While various aspects have been disclosed herein, other aspects will be apparent to those of skill in the art. The various aspects disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting. For example, while the disclosed embodiments focus on LTE-based implementations, the disclosed systems and methods are equally applicable to any other protocol or network implementation that is configurable to allocate frequencies to traffic demands as described herein.

What is claimed is:

1. In a base station of a wireless communication network, a method comprising: receiving (i) a first random access channel (RAC) request from a first user equipment device (UE) assigned to operate in a first frequency band of the wireless communication network and (ii) a second RAC request from a second UE assigned to operate in a different, second frequency band of the wireless communication network, the first and second RAC requests being received within a threshold time interval of each other, and both being for uplink communications; making a determination that the first frequency band is more susceptible to group delay variation based impairments on uplink transmissions than the second frequency band; and in response to the determination, prioritizing an uplink channel grant of the first RAC request over an uplink channel grant of the second RAC request, wherein the threshold time interval corresponds to an average processing time for the base station to process RAC requests from UEs it is serving, the processing time for any given RAC request being an interval from receipt of the given RAC request until one of an uplink channel grant or an uplink channel denial, and wherein prioritizing the uplink channel grant of the first RAC request over the uplink channel grant of the second RAC request comprises granting an uplink channel to the first UE in response to the first RAC request before granting an uplink channel to the second UE in response to the second RAC request.

2. The method of claim 1, further comprising: prior to receiving the first RAC request, assigning the first UE to operate in the first frequency band in response to receiving a request for service from the first UE; and prior to receiving the second RAC request, assigning the second UE to operate in the second frequency band in response to receiving a request for service from the second UE.

3. The method of claim 2, wherein the first and second frequency bands are distinct, non-overlapping radio frequency (RF) intervals, each comprising a set of sub-carrier frequencies, wherein assigning the first UE to operate in the first frequency band comprises designating the sub-carrier frequencies of the first frequency band for allocation in particular sub-sets when granting RAC requests from the first UE for uplink communications, and wherein assigning the second UE to operate in the second frequency band comprises designating the sub-carrier frequencies of the second frequency band for allocation in particular sub-sets when granting RAC requests from the second UE for uplink communications.

4. The method of claim 1, wherein receiving the first RAC request from the first UE comprises receiving a RAC request from the first UE for one of: an uplink channel for a new uplink transmission, or an uplink channel for at least a partial repeat of an at least partially unsuccessful, previous transmission.

5. The method of claim 1, further comprising: receiving a third RAC request from a third UE assigned to operate in the second frequency band of the wireless communication network, the third RAC request being received within the same threshold time interval as the first and second RAC requests, and being for uplink communications; and in response to the determination, prioritizing the uplink channel grant of the first RAC request over an uplink channel grant of the third RAC request.

6. The method of claim 1, wherein the base station is an LTE eNodeB, wherein each of the first and second the frequency bands lies within or is coextensive with a respective LTE band and comprises LTE resource blocks, wherein making the determination comprises determining that sub-carriers of LTE resource blocks in the first frequency band are more susceptible to group delay variation based impairments than sub-carriers of LTE resource blocks in the second frequency band, and wherein granting the uplink channel to the first UE in response to the first RAC request before granting the uplink channel to the second UE in response to the second RAC request comprises granting one or more uplink LTE resource blocks to the first UE in response to the first RAC request before granting one or more uplink LTE resource blocks to the second UE.

7. A base station comprising: one or more transceivers and filters configured to operate in at least both of a first frequency band of a wireless communication network and a different, second frequency band of the wireless communication network, wherein the first frequency band is more susceptible to group delay variation based impairments than the second frequency band; one or more processors; and tangible, non-transitory computer readable memory having instructions stored thereon that, upon execution by the one or more processors, cause the base station to carry out operations including: receiving (i) a first random access channel (RAC) request from a first user equipment device (UE) assigned to operate in the first frequency band and (ii) a second RAC request from a second UE assigned to operate in the second frequency band, the first and second RAC requests being received within a threshold time interval of each other, and both being for uplink communications; and in response to the first frequency band being more susceptible to group delay variation based impairments on uplink transmissions than the second frequency band, prioritizing an uplink channel grant of the first RAC request over an uplink channel grant of the second RAC request, wherein the threshold time interval corresponds to an average processing time for the base station to process RAC requests from UEs it is serving, the processing time for any given RAC request being an interval from receipt of the given RAC request until one of an uplink channel grant or an uplink channel denial, and wherein prioritizing the uplink channel grant of the first RAC request over the uplink channel grant of the second RAC request comprises granting an uplink channel to the first UE in response to the first RAC request before granting an uplink channel to the second UE in response to the second RAC request.

8. The base station of claim 7, wherein the first and second frequency bands are distinct, non-overlapping radio frequency (RF) intervals, each comprising a set of sub-carrier frequencies, and wherein the operations further include: prior to receiving the first RAC request, responding to a request for service from the first UE by designating the sub-carrier frequencies of the first frequency band for allocation in particular sub-sets when granting RAC requests from the first UE for uplink communications; and prior to receiving the second RAC request, responding to a request for service from the second UE by designating the sub-carrier frequencies of the second frequency band for allocation in particular sub-sets when granting RAC requests from the second UE for uplink communications.

9. The base station of claim 7, wherein receiving the first RAC request from the first UE comprises receiving a RAC request from the first UE for one of: an uplink channel for a new uplink transmission, or an uplink channel for at least a partial repeat of an at least partially unsuccessful, previous transmission.

10. The base station of claim 7, the operations further include: receiving a third RAC request from a third UE assigned to operate in the second frequency band of the wireless communication network, the third RAC request being received within the same threshold time interval as the first and second RAC requests, and being for uplink communications; and in response to the determination, prioritizing the uplink channel grant of the first RAC request over an uplink channel grant of the third RAC request.

11. The base station of claim 7, wherein the base station is an LTE eNodeB, wherein each of the first and second the frequency bands lies within or is coextensive with a respective LTE band and comprises LTE resource blocks, wherein making the determination comprises determining that sub-carriers of LTE resource blocks in the first frequency band are more susceptible to group delay variation based impairments than sub-carriers of LTE resource blocks in the second frequency band, and wherein granting the uplink channel to the first UE in response to the first RAC request before granting the uplink channel to the second UE in response to the second RAC request comprises granting one or more uplink LTE resource blocks to the first UE in response to the first RAC request before granting one or more uplink LTE resource blocks to the second UE.

12. A non-transitory computer readable medium having stored thereon instructions that, upon execution by one or more processors of a base station, cause the base station to carry out operations, wherein the base station is configured to operate in at least both of a first frequency band of a wireless communication network and a different, second frequency band of the wireless communication network, wherein the first frequency band is more susceptible to group delay variation based impairments than the second frequency band, and wherein the operations include: receiving (i) a first random access channel (RAC) request from a first user equipment device (UE) assigned to operate in the first frequency band and (ii) a second RAC request from a second UE assigned to operate in the second frequency band, the first and second RAC requests being received within a threshold time interval of each other, and both being for uplink communications; and in response to the first frequency band being more susceptible to group delay variation based impairments on uplink transmissions than the second frequency band, prioritizing an uplink channel grant of the first RAC request over an uplink channel grant of the second RAC request, wherein the threshold time interval corresponds to an average processing time for the base station to process RAC requests from UEs it is serving, the processing time for any given RAC request being an interval from receipt of the given RAC request until one of an uplink channel grant or an uplink channel denial, and wherein prioritizing the uplink channel grant of the first RAC request over the uplink channel grant of the second RAC request comprises granting an uplink channel to the first UE in response to the first RAC request before granting an uplink channel to the second UE in response to the second RAC request.

13. The non-transitory computer readable medium of claim 12, wherein the first and second frequency bands are distinct, non-overlapping radio frequency (RF) intervals, each comprising a set of sub-carrier frequencies, and wherein the operations further include: prior to receiving the first RAC request, responding to a request for service from the first UE by designating the sub-carrier frequencies of the first frequency band for allocation in particular sub-sets when granting RAC requests from the first UE for uplink communications; and prior to receiving the second RAC request, responding to a request for service from the second UE by designating the sub-carrier frequencies of the second frequency band for allocation in particular sub-sets when granting RAC requests from the second UE for uplink communications.

14. The non-transitory computer readable medium of claim 12, wherein receiving the first RAC request from the first UE comprises receiving a RAC request from the first UE for one of: an uplink channel for a new uplink transmission, or an uplink channel for at least a partial repeat of an at least partially unsuccessful, previous transmission.

15. The non-transitory computer readable medium of claim 12, wherein the operations further include: receiving a third RAC request from a third UE assigned to operate in the second frequency band of the wireless communication network, the third RAC request being received within the same threshold time interval as the first and second RAC requests, and being for uplink communications; and in response to the determination, prioritizing the uplink channel grant of the first RAC request over an uplink channel grant of the third RAC request.

16. The non-transitory computer readable medium of claim 12, wherein the base station is an LTE eNodeB, wherein each of the first and second the frequency bands lies within or is coextensive with a respective LTE band and comprises LTE resource blocks, wherein making the determination comprises determining that sub-carriers of LTE resource blocks in the first frequency band are more susceptible to group delay variation based impairments than sub-carriers of LTE resource blocks in the second frequency band, and wherein granting the uplink channel to the first UE in response to the first RAC request before granting the uplink channel to the second UE in response to the second RAC request comprises granting one or more uplink LTE resource blocks to the first UE in response to the first RAC request before granting one or more uplink LTE resource blocks to the second UE.

* * * * *